United States Patent
Kulkarni et al.

(10) Patent No.: US 9,133,345 B2
(45) Date of Patent: Sep. 15, 2015

(54) METALLIC BONDCOAT OR ALLOY WITH A HIGH GAMMA/GAMMA' TRANSITION TEMPERATURE AND A COMPONENT

(75) Inventors: Anand A. Kulkarni, Oviedo, FL (US); Jonathan E. Shipper, Jr., Orlando, FL (US); Werner Stamm, Mülheim an der Ruhr (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 429 days.

(21) Appl. No.: 13/635,965

(22) PCT Filed: Mar. 23, 2010

(86) PCT No.: PCT/US2010/028220
§ 371 (c)(1),
(2), (4) Date: Oct. 18, 2012

(87) PCT Pub. No.: WO2011/119145
PCT Pub. Date: Sep. 29, 2011

(65) Prior Publication Data
US 2013/0136648 A1 May 30, 2013

(51) Int. Cl.
*C22C 19/05* (2006.01)
*C09D 1/00* (2006.01)
*C22C 30/00* (2006.01)
*C23C 4/08* (2006.01)
*C23C 30/00* (2006.01)
*F01D 5/28* (2006.01)
*C23C 24/04* (2006.01)

(52) U.S. Cl.
CPC ............... *C09D 1/00* (2013.01); *C22C 19/058* (2013.01); *C22C 30/00* (2013.01); *C23C 4/08* (2013.01); *C23C 4/085* (2013.01); *C23C 24/04* (2013.01); *C23C 30/00* (2013.01); *F01D 5/288* (2013.01); *Y02T 50/67* (2013.01)

(58) Field of Classification Search
CPC .............................. C22C 19/058; C22C 30/00
See application file for complete search history.

(56) References Cited

U.S. PATENT DOCUMENTS

| | | | |
|---|---|---|---|
| 4,447,503 | A | 5/1984 | Shankar |
| 4,447,603 | A | 5/1984 | Paul |
| 4,500,489 | A | 2/1985 | Nicoll |
| 6,024,792 | A | 2/2000 | Bieler |
| 6,410,153 | B1 | 6/2002 | Jones |
| 2011/0200443 | A1 | 8/2011 | Hasselqvist |

FOREIGN PATENT DOCUMENTS

| | | |
|---|---|---|
| EP | 0532150 A1 | 3/1993 |
| EP | 0486489 B1 | 11/1994 |
| EP | 0412397 B1 | 3/1998 |
| EP | 0892090 A1 | 1/1999 |
| EP | 0786017 B1 | 3/1999 |
| EP | 1031637 A1 | 8/2000 |
| EP | 1306454 A1 | 5/2003 |
| EP | 1319729 A1 | 6/2003 |
| EP | 1204776 B1 | 6/2004 |
| EP | 1803896 A2 | 7/2007 |
| EP | 2145968 A1 | 1/2010 |
| EP | 2145969 A1 | 1/2010 |
| JP | 2007177789 | 12/1980 |
| JP | S55161041 A | 12/1980 |
| JP | 55161041 A | 7/2007 |
| JP | 2007177789 A | 7/2007 |
| JP | 2008045176 A | 2/2008 |
| JP | 2013622475 A | 6/2013 |
| RU | 2147624 C1 | 4/2000 |
| WO | WO 9967435 A1 | 12/1999 |
| WO | WO 0044949 A1 | 8/2000 |
| WO | WO 2006104136 A1 | 10/2006 |
| WO | WO 2006104138 A1 | 10/2006 |
| WO | WO 2008032806 A1 | 3/2008 |

OTHER PUBLICATIONS

ASM International, Materials Park, Ohio, ASM Handbook vol. 2: Properties and Selection: Nonferrous Alloys and Special Purpose Materials "Rare Earth Metals", pp. 720-732, Oct. 1990.*
English Abstract and English Machine Translation of Harada et al. (JP 2008-045176) (Feb. 28, 2008).*
Sun Genchang et al: "Analysis on structure of tantalum-containing nickel-based high temperature alloy"; Shanghai Steel & Iron Research No. 6: pp. 21-28; 1987; CN; Dec. 31, 1987.

* cited by examiner

*Primary Examiner* — Jessee Roe

(57) ABSTRACT

A metallic coating is provided. The nickel based metallic coating includes tantalum, cobalt, chromium, and aluminum. The nickel based metallic coating does not include silicon and/or hafnium and/or zirconium. A tantalum addition in nickel based coating stabilized the phases gamma/gamma$^1$ at high temperatures leading to a reduction of local stresses.

7 Claims, 4 Drawing Sheets

FIG 5

| material | chemical composition in % | | | | | | | | | | | | | |
|---|---|---|---|---|---|---|---|---|---|---|---|---|---|---|
| | C | Cr | Ni | Co | Mo | W | Ta | Nb | Al | Ti | B | Zr | Hf |
| Ni-base | | | | | | | | | | | | | |
| GTD 222 | 0.10 | 22.5 | Rest | 19.0 | | 2.0 | 1.0 | | 1.2 | 2.3 | 0.008 | | |
| IN 939 | 0.15 | 22.4 | Rest | 19.0 | | 2.0 | 1.4 | 1.0 | 1.9 | 3.7 | 0.009 | 0.10 | |
| IN 6203 DS | 0.15 | 22.0 | Rest | 19.0 | | 2.0 | 1.1 | 0.8 | 2.3 | 3.5 | 0.010 | 0.10 | 0.75 |
| Udimet 500 | 0.10 | 18.0 | Rest | 18.5 | 4.0 | | | | 2.9 | 2.9 | 0.006 | 0.05 | |
| IN 738 LC | 0.10 | 16.0 | Rest | 8.5 | 1.7 | 2.6 | 1.7 | 0.9 | 3.4 | 3.4 | 0.010 | 0.10 | |
| SC 16 | <0.01 | 16.0 | Rest | | 3.0 | | 3.5 | | 3.5 | 3.5 | <0.005 | <0.008 | |
| Rene 80 | 0.17 | 14.0 | Rest | 9.5 | 4.0 | 4.0 | | | 3.0 | 5.0 | 0.015 | 0.03 | |
| GTD 111 | 0.10 | 14.0 | Rest | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rest | 9.0 | 1.9 | 4.1 | 4.1 | | 3.4 | 3.8 | 0.015 | 0.02 | 1.00 |
| IN 792 DS | 0.08 | 12.5 | Rest | 9.0 | 1.9 | 4.1 | 4.1 | | 3.4 | 3.8 | 0.015 | 0.02 | |
| MAR M 002 | 0.15 | 9.0 | Rest | 10.0 | | 10.0 | 2.5 | | 5.5 | 1.5 | 0.015 | 0.05 | 1.50 |
| MAR M 247 LC DS | 0.07 | 8.1 | Rest | 9.2 | 0.5 | 9.5 | 3.2 | | 5.6 | 0.7 | 0.015 | 0.02 | 1.40 |
| CMSX-2 | <.006 | 8.0 | Rest | 4.6 | 0.6 | 8.0 | 6.0 | | 5.6 | 1.0 | <.003 | <.0075 | 0.10 |
| CMSX-3 | <.006 | 8.0 | Rest | 4.6 | 0.6 | 8.0 | 6.0 | | 5.6 | 1.0 | <.003 | <.0075 | 0.10 |
| CMSX-4 | | 6.0 | Rest | 10.0 | 0.6 | 6.0 | 6.0 | | 5.6 | 1.0 | | Re=3.0 | 0.10 |
| CMSX-6 | <.015 | 10.0 | Rest | 5.0 | 3.0 | <.10 | 2.0 | <.10 | 4.9 | 4.8 | <.003 | <.0075 | 0.10 |
| PWA 1480 SX | <.006 | 10.0 | Rest | 5.0 | | 4.0 | 12.0 | | 5.0 | 1.5 | <.0075 | <.0075 | |
| PWA 1483 SX | 0.07 | 12.2 | Rest | 9.0 | 1.9 | 3.8 | 5.0 | | 3.6 | 4.2 | 0.0001 | 0.002 | |
| Co-base | | | | | | | | | | | | | |
| FSX 414 | 0.25 | 29.0 | 10 | Rest | | 7.5 | | | | | 0.010 | | |
| X 45 | 0.25 | 25.0 | 10 | Rest | | 8.0 | | | 0.25 | | 0.010 | | |
| ECY 768 | 0.65 | 24.0 | 10 | 51.7 | | 7.5 | 4.0 | | | 0.3 | 0.010 | 0.05 | |
| MAR-M 509 | 0.65 | 24.5 | 11 | Rest | | 7.5 | 4 | | | 0.3 | 0.010 | 0.60 | |
| CM 247 | 0.07 | 8.3 | Rest | 10.0 | 0.5 | 9.5 | 3.2 | | 5.5 | 0.7 | | | 1.5 | ical vapor deposition (EBPVD), cold spray (CS) or high velocity oxy-fuel (HVOF) process. The MCrAlY coat# METALLIC BONDCOAT OR ALLOY WITH A HIGH GAMMA/GAMMA' TRANSITION TEMPERATURE AND A COMPONENT

CROSS REFERENCE TO RELATED APPLICATIONS

This application is the US National Stage of International Application No. PCT/US2010/028220, filed Mar. 23, 2010 and claims the benefit thereof. All of the applications are incorporated by reference herein in their entirety.

FIELD OF INVENTION

The invention relates to a metallic bondcoat with phases of γ and γ' a component.

BACKGROUND OF INVENTION

Components for the hot gas path in gas turbines are made from Ni- or Co based materials. These materials are optimized for strength and are not able to withstand oxidation and/or corrosion attack at higher temperatures. Therefore, these kinds of materials must be protected against oxidation by MCrAlY-coatings which can be used as bondcoats for thermal barrier coating (TBC) systems as well. In TBS systems, the MCrAlY coating is needed against hot gas attack on one side and on the other side this coating is needed to adhere the TBC to the substrate Improving such systems against oxidation will lead to increased bondcoats service temperatures with increased life properties.

To protect the materials against hot corrosion/oxidation, MCrAlY overlay coatings are coated mainly by low pressure plasma spraying (LPPS), air plasma spraying (APS), electron beam physical vapor deposition (EBPVD), cold spray (CS) or high velocity oxy-fuel (HVOF) process. The MCrAlY coating is based on nickel and/or cobalt, chromium, aluminum, silicon, rhenium and rare earth elements like yttrium. With increasing bondcoat temperatures, these coatings can fail which can lead to spallation of the thermal barrier coating. Therefore, with increasing service temperatures, improved coatings are needed to withstand the oxidation attack. Additionally this kind of coatings should have acceptable thermomechanical properties. These requests can only be achieved by an optimized composition of the bond coat.

SUMMARY OF INVENTION

It is therefore the aim of the invention to solve the above mentioned problem.

The problem is solved by a metallic coating or an alloy according to the claims and a component according to the claims.

In the dependent claims further amendments are disclosed which can be arbitrarily combined with each other to yield further advantages.

BRIEF DESCRIPTION OF THE DRAWINGS

It shows
FIGS. 1, 2 fraction of γ', γ, and β-phases in the alloy,
FIG. 3 a turbine blade,
FIG. 4 a gas turbine and
FIG. 5 a list of super alloys.
The figures and the description are only embodiments of the invention.

DETAILED DESCRIPTION OF INVENTION

Figure 3:
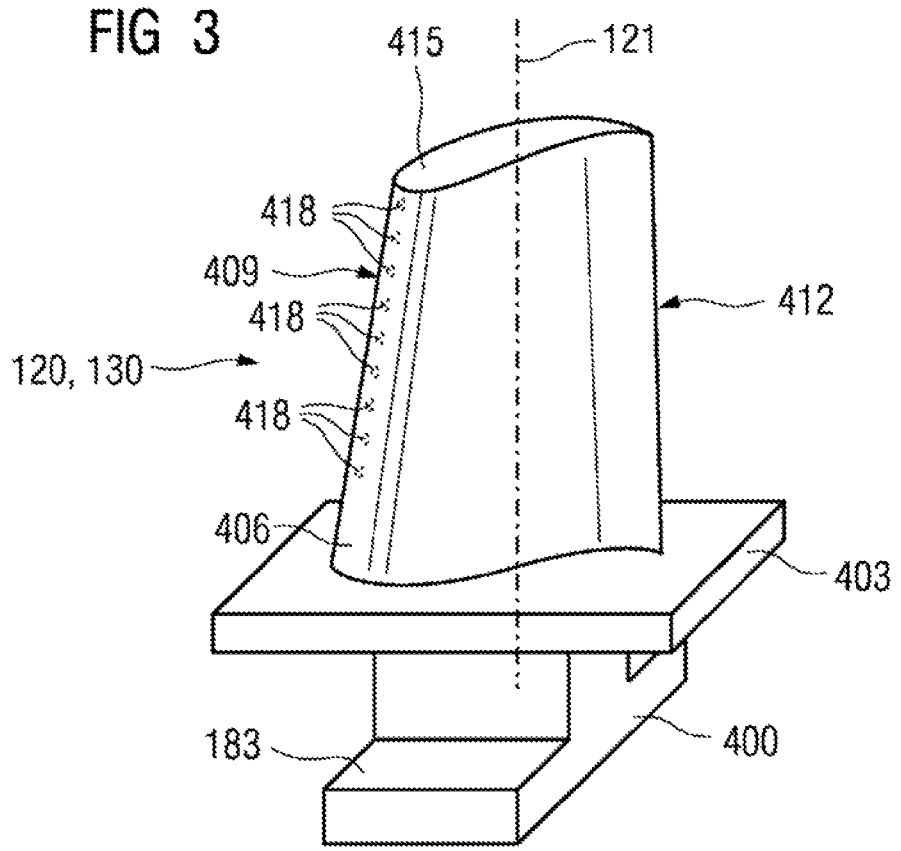

FIG. 3 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 as well as a blade or vane tip 415.

As a guide vane 130, the vane 130 may have a further platform (not shown) at its vane tip 415.

A blade or vane root 183, which is used to secure the rotor blades 120, 130 to a shaft or disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, also by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1.

The blades or vanes 120, 130 may likewise have coatings protecting against corrosion or oxidation, e.g. MCrAlX (M is at least one element selected from the group consisting of iron (Fe), cobalt (Co), nickel (Ni), X is an active element and represents yttrium (Y) and/or silicon and/or at least one rare earth element, or hafnium (Hf). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

The density is preferably 95% of the theoretical density.

A protective aluminum oxide layer (TGO=thermally grown oxide layer) forms on the MCrAlX layer (as an intermediate layer or an outermost layer).

It is also possible for a thermal barrier coating, consisting for example of $ZrO_2$, $Y_2O_3$—$ZrO_2$, i.e. unstabilized, partially stabilized or fully stabilized by yttrium oxide and/or calcium oxide and/or magnesium oxide and/or one or more of rare earth element (lanthanum, gadolinium, yttrium, etc.), which is preferably the outermost layer, to be present on the MCrAlX.

The thermal barrier coating covers the entire MCrAlX layer. Columnar grains are produced in the thermal barrier coating by means of suitable coating processes, such as for example electron beam physical vapor deposition (EB-PVD).

Other coating processes are conceivable, for example atmospheric plasma spraying (APS), LPPS, VPS, solution precursor plasma spray (SPPS) or CVD. The thermal barrier coating may include porous grains which have microcracks or macrocracks for improving its resistance to thermal shocks. The thermal barrier coating is therefore preferably more porous than the MCrAlX layer.

The blade or vane 120, 130 may be hollow or solid in form. If the blade or vane 120, 130 is to be cooled, it is hollow and may also have film-cooling holes 418 (indicated by dashed lines).

Figure 4:
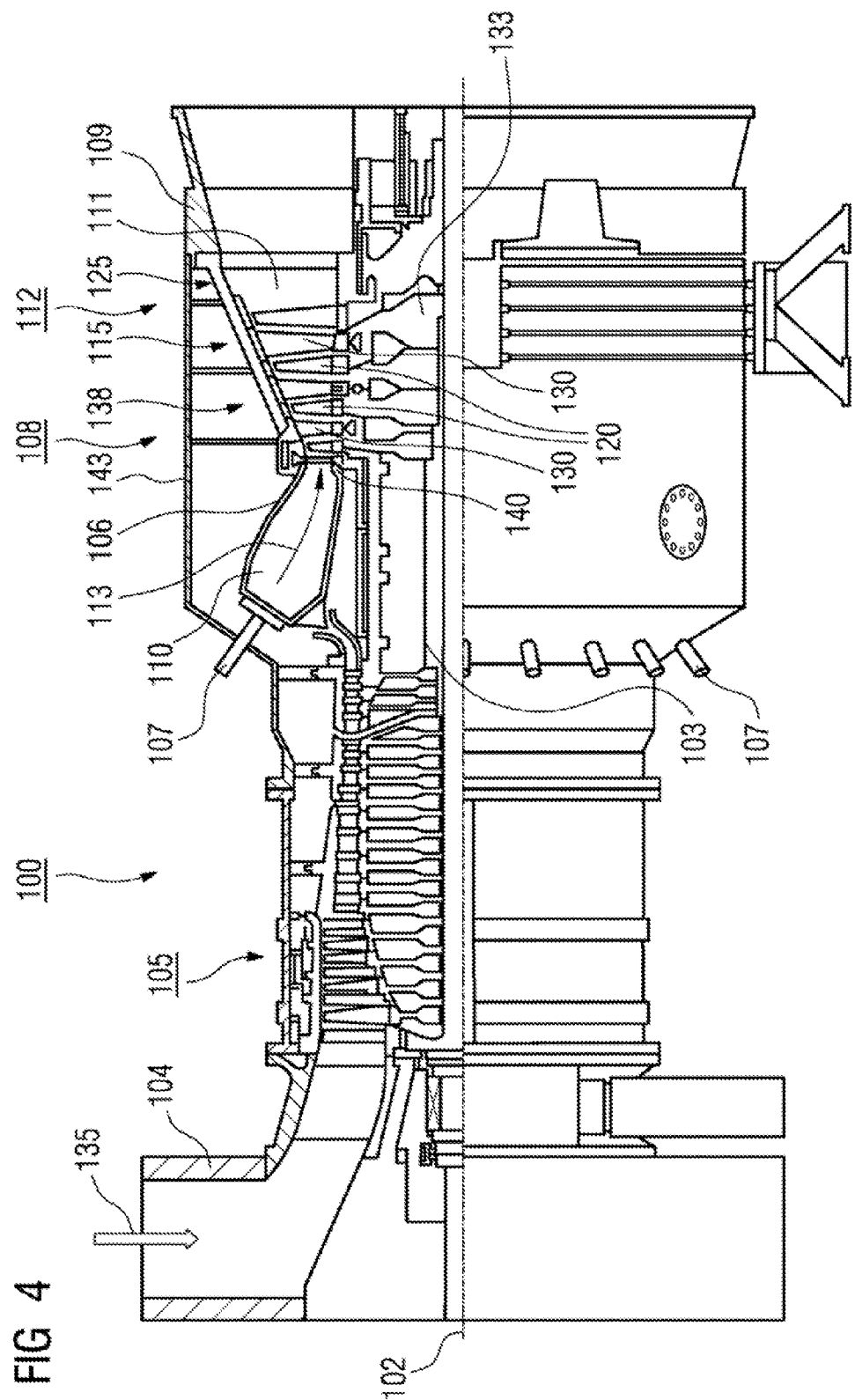

FIG. 4 shows, by way of example, a partial longitudinal section through a gas turbine 100.

In the interior, the gas turbine 100 has a rotor 103 which is mounted such that it can rotate about an axis of rotation 102, has a shaft 101 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield bricks which line the annular combustion chamber 110, are subject to the highest thermal stresses.

To be able to withstand the temperatures which prevail there, they can be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949.

The guide vane 130 has a guide vane root (not shown here) facing the inner housing 138 of the turbine 108 and a guide vane head at the opposite end from the guide vane root. The guide vane head faces the rotor 103 and is fixed to a securing ring 140 of the stator 143.

Figure 2:
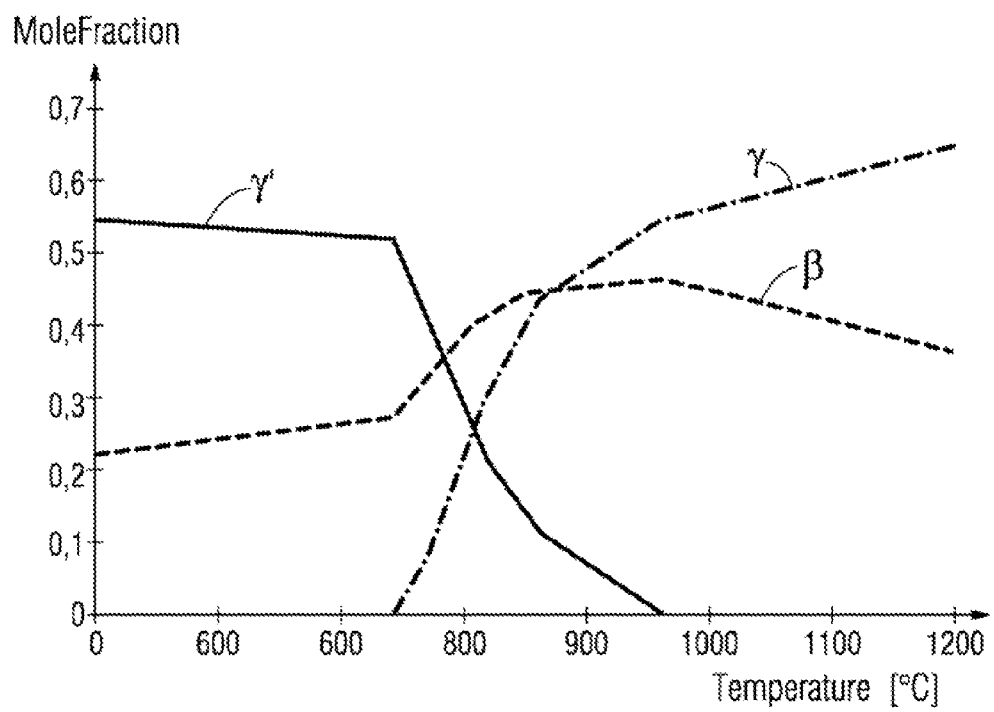

A new modified coating was developed which fulfils the requirements described above. This coating has a good long term life, acceptable mechanical properties and improved oxidation resistance. This is based on the presence of tantalum (Ta) in a nickel based alloy but preferably without rhenium (Re). Tantalum (Ta) stabilizes the formation of a three phase system ($\gamma'/\gamma/\beta$) with a high $\gamma'/\gamma$ transition temperature (see FIG. 2). This will reduce the local stresses as well because tantalum (Ta) will stabilize the high transition temperatures of $\gamma'$ which is higher than the bondcoat service temperature.

Therefore there is preferably no need for hafnium (Hf), silicon (Si) or zirconium (Zr) in the coating.

Very good results show the following elemental composition for getting the proposed 3-phase-system with increased $\gamma'$ transition temperatures: Ni—23Co—17Cr—10Al—2Ta—0, 3Y.

Figure 1:
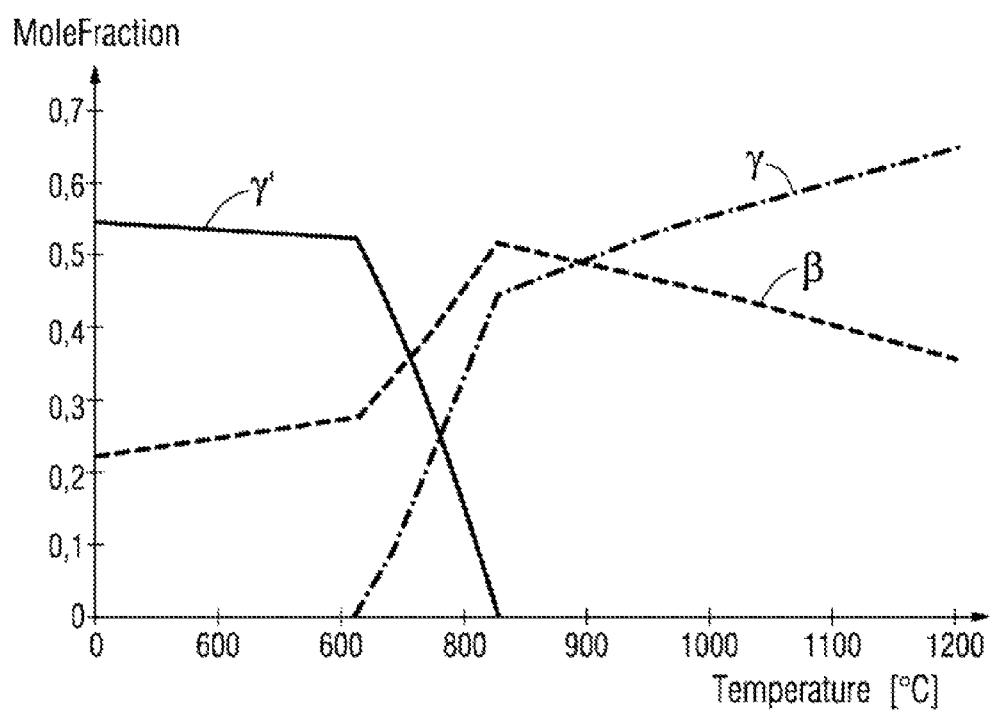

A composition (Ni—25Co—17Cr—10Al—1.5Re—Y) which contains rhenium (Re) instead of tantalum (Ta) has a lower $\gamma'/\gamma$ transition temperature because no tantalum is added (see FIG. 1).

The bondcoat is preferably a nickel (Ni) based super alloy with addition of cobalt (Co), chromium (Cr), aluminum (Al) and optionally yttrium (Y) which is preferably consisting of these elements.

Very preferably it is a MCrAlY alloy, with M=Ni, Co.

Preferably the alloy contains no molybdenum (Mo), and/or no tungsten (W) and/or columbium (Nb).

The invention claimed is:

1. A nickel-based metallic coating, which contains $\gamma$ and $\gamma'$ phases, consisting of:
   between 0.1 wt %-7 wt % tantalum;
   18-27 wt % cobalt;
   between 15 wt %-19 wt % chromium;
   between 8 wt %-12 wt % aluminum,
   at least 0.1 wt % yttrium; and
   remainder nickel.

2. The metallic coating according to claim 1, wherein the amount of cobalt is between 21 wt %-24 wt %.

3. The metallic coating according to claim 1, wherein the amount of yttrium is between 0.1 wt %-0.7 wt %.

4. The metallic coating according to claim 1, wherein the metallic coating has a higher $\gamma'/\gamma$ transition compared to an NiCoCrAlY alloy or coating with rhenium and without tantalum.

5. The metallic coating according to claim 1, further comprising the $\beta$-phase.

6. A component, comprising:
a metallic coating according to claim 1.

7. The metallic coating according to claim 1 consisting of:
23 wt % cobalt;
17 wt % chromium;
10 wt % aluminum;
2 wt % tantalum;
0.3 wt % yttrium; and
remainder nickel.

* * * * *